United States Patent [19]

Campbell et al.

[11] Patent Number: 4,965,955
[45] Date of Patent: Oct. 30, 1990

[54] CAPTURE APPARATUS FOR MARINE ANIMALS

[76] Inventors: Robert M. Campbell, 4397 Golfers Cir. West, Palm Beach Gardens, Fla. 33410; Mark G. Duer, 225 River Ter., Jupiter, Fla. 33469

[21] Appl. No.: 387,232

[22] Filed: Jul. 31, 1989

[51] Int. Cl.[5] .............................................. A01K 63/02
[52] U.S. Cl. .............................................. 43/4; 119/3; 43/55
[58] Field of Search .................... 43/4, 55, 56, 103; 119/3

[56] References Cited

U.S. PATENT DOCUMENTS

| | | | |
|---|---|---|---|
| 1,876,692 | 2/1930 | Kornsweet. | |
| 2,672,845 | 3/1954 | Schneithorst | 119/3 |
| 2,688,817 | 11/1949 | Brune. | |
| 3,168,887 | 2/1965 | Bodell | 119/3 |
| 3,184,878 | 5/1965 | Senne | 43/4 |
| 3,754,348 | 3/1973 | Ramsey. | |
| 3,754,551 | 5/1973 | Nielsen. | |
| 3,877,427 | 7/1975 | Alexeev et al. . | |
| 4,079,698 | 3/1978 | Neff | 119/3 |
| 4,089,131 | 5/1978 | Phillips | 43/4 |
| 4,201,153 | 5/1980 | Nace | 119/3 |
| 4,399,629 | 8/1983 | Duncan | 43/4 |
| 4,467,798 | 8/1984 | Saxon et al. . | |
| 4,498,190 | 2/1985 | Harlick | 43/55 |
| 4,811,729 | 4/1989 | Sands et al. . | |

Primary Examiner—Kurt Rowan
Attorney, Agent, or Firm—Eckert Seamans Cherin & Mellott

[57] ABSTRACT

An apparatus and method are provided for transferring marine creatures from one pressure environment to another. The apparatus includes a rigid container having at least one access opening, and a fluid-tight closure for the access opening. Structure is provided for gradually permitting the escape of fluid from within the container, and thereby the release of pressure. Pressure-indicating structure is also provided to facilitate the release of pressure within the container at a controlled rate. At least a portion of the container preferably is transparent to permit viewing of the marine animal within the container. A method for transferring marine animals from one pressure environment to another is also disclosed.

26 Claims, 3 Drawing Sheets

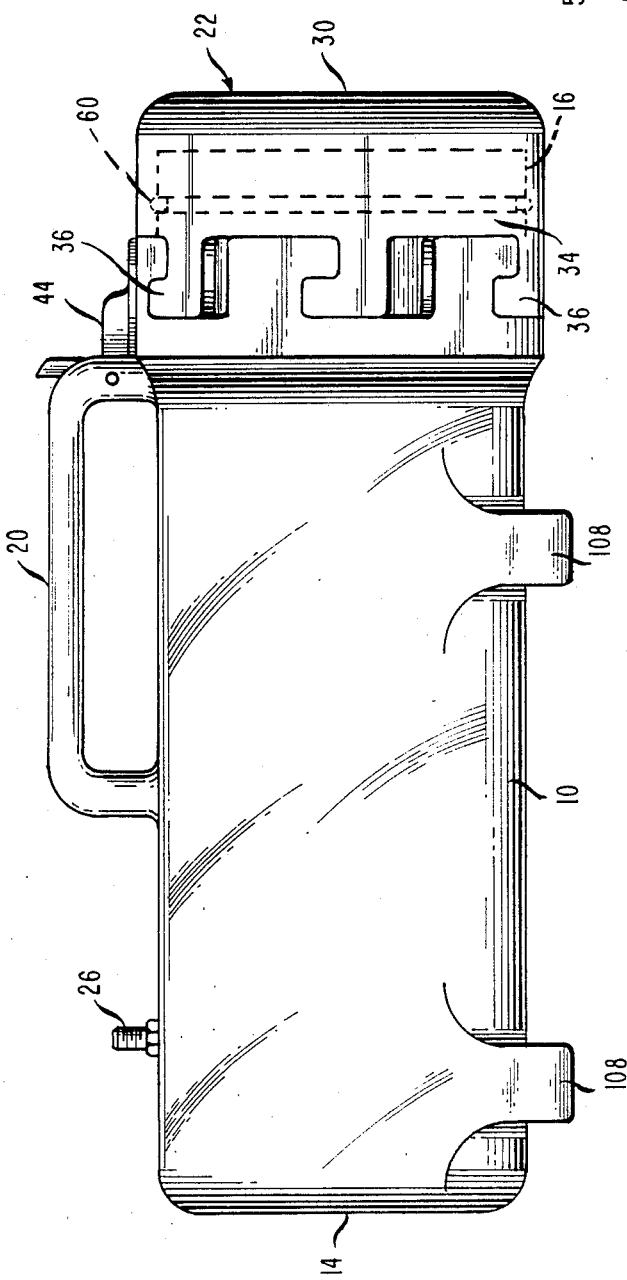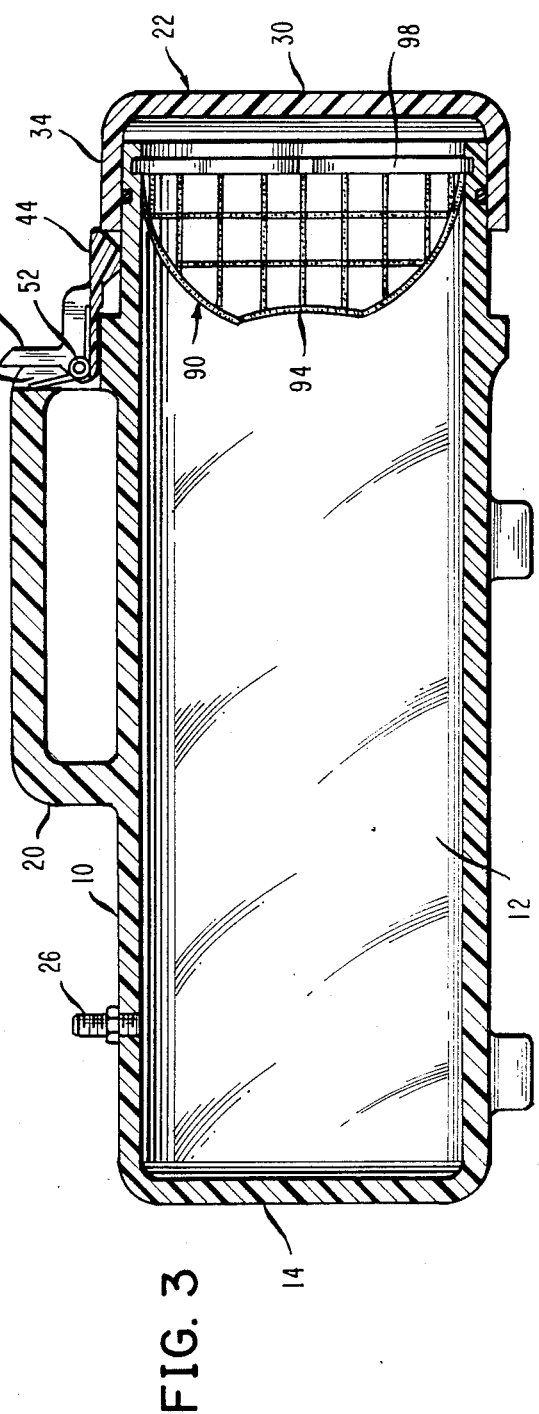

CAPTURE APPARATUS FOR MARINE ANIMALS

BACKGROUND OF THE INVENTION

1. Field of the Invention

This invention relates generally to marine apparatus, and particularly to apparatus for capturing marine animals.

2. Description of the Prior Art

Marine animals living at depths substantially below the water surface are subjected to a pressure environment substantially in excess of that found at the surface. Ascent from this first pressure environment beneath the surface to a second, reduced pressure environment can injure or kill the animal if the ascent is too rapid. Divers collecting live underwater specimens typically place these animals into porous bags or other enclosures and carry the animals with the diver during the ascent to the surface. The diver must take great care in controlling the rate of ascent, so as not to subject the animal to a rapid change in pressure that will injure the animal.

A number of inventions have been directed to apparatus for capturing and transporting marine animals. Examples include Kornsweet, U.S. Pat. No. 1,876,692; Brune, U.S. Pat. No. 2,688,817; and Ramsey, U.S. Pat. No. 3,754,348. These devices collectively fail to address the problem of physiological damage to the animal caused by a rapid ascent.

SUMMARY OF THE INVENTION

It is an object of the invention to provide a capture apparatus for marine animals which will permit a relatively rapid transport of the animals from one pressure environment to another without physiological injury to the animals.

It is another object of the invention to provide a capture apparatus for marine animals which will be easy to use in the underwater environment.

It is still another object of the invention to provide a method for transporting marine animals from a first pressure environment to a second pressure environment without risk of injury to the creature.

These an other objects are accomplished by an apparatus including a rigid container or pressure chamber having at least one access opening and structure for closing the access opening so as to provide a fluid-tight, pressure-tight container for the marine animal. Structure is provided for gradually relieving pressure within the container by permitting the escape of fluid from the container. Means for indicating pressure within the container is also preferably provided to facilitate a controlled release of pressure from the container.

According to the method of the invention, the marine animal is placed by the diver into the container through the access opening when it is desired to transport the animal from a first pressure environment to a second pressure environment, as to the surface. A small amount of air is introduced into the container. Gases other than air can be used, although pressurized air is more commonly available to the diver. The access opening is closed so as to create a fluid- and pressure-tight environment for the animals within the container. The diver then moves to the desired pressure environment, usually the surface. The structure for releasing pressure within the container is manipulated to release air or water from the container at a controlled rate, so as to permit the animals within to gradually become accustomed to the second pressure environment, and without harm to the animals.

The means for gradually releasing pressure from the container is preferably a valve and can be constructed in any of several suitable designs. These include the familiar "bicycle" type valve which has a central valve member that is mounted so as to be axially movable within a valve stem, and is biased to a "closed" position by a biasing spring. This valve construction allows the use of a hand or foot pump to introduce air under pressure into the rigid container for the purpose of repressurization.

The means for indicating pressure within the rigid container can be a pressure gauge of any suitable design. The pressure gauge may be built into the rigid container. Alternatively, the pressure gauge can be provided separately and detachably mounted to suitable retaining structure provided with the capture apparatus such that the pressure gauge is in fluid communication with the interior of the rigid container. This will permit the use of a pressure gauge for other purposes.

The structure for closing the access opening is preferably a lid. The lid has structure for securing the lid to portions of the container about the access opening. In a preferred embodiment, the container is substantially tubular and has one closed end. The open end forms the access opening. Portions of the container surrounding the access opening has first engagement means and the lid has second engagement means. The first engagement means is engagable to the second engagement means to secure the lid over the access opening in a fluid-tight, pressure-tight connection.

The first engagement means preferably comprises substantially L-shaped grooves disposed about the exterior circumference of the open end of the container. The second engagement means preferably comprises a number of L-shaped projections disposed about the circumference of the lid and oriented substantially at right angles to the plane of the lid. The L-shaped projections of the lid are adapted for insertion into the L-shaped grooves, and can be locked with respect to the grooves by rotating the lid so as to interlock the L-shaped projections into the L-shaped grooves. A locking tab can be provided and includes spring biasing adapted to position the tab in one of the L-shaped grooves. The locking tab will prevent movement of the L-shaped projection within the groove. This will securely lock the lid in fluid-tight connection over the access opening. Other engagement structure, such as cooperating male and female threads, buckles or other fasteners, is also possible.

It is desirable to provide seal structure between the lid and portions of the container surrounding the access opening to render the joint as fluid-tight as possible. Seal structure can be provided as an "o-ring" which can be attached to either of the lid or a portion of the container surrounding the access opening. The seal is preferably elastomeric and will be compressed by engagement of the lid to the container to form a fluid-tight seal around the access opening and between the container and the lid.

It is desirable that the marine animals within the container are visible to the diver so that the condition of the animals can be closely monitored. A window or other viewing port can be provided, although it is presently preferred to manufacture substantially the entire container from a transparent material to provide good visibility of the animals when within the container. A suitable material must not only by transparent, but also rigid, fluid- and pressure-tight, durable and resistant to corrosion. Presently preferred materials include clear polyvinyl chloride and acrylics.

Air will normally be inserted into the container by the diver with utilization of the diver's breathing apparatus, the outlet of which is placed adjacent to the access opening to release air into the container. Means for indicating a sufficient amount of air can include an air volume line or other marking on the container. Air is placed into the container until the amount of air in the container reaches the air volume line. This will insure that a sufficient amount of air is present in the container to allow the gradual release of pressure from the container.

The pressure inside the container will sometimes rise significantly when the lid is pressed into place over the access opening. It is difficult to move the lid into place against this pressure. The valve can be held open while positioning the lid to release pressure within the container as the lid is pressed over the access opening.

It is desirable to provide structure associated with the access opening which will prevent the marine animals from inadvertently escaping the rigid container while the access opening is uncovered. Entrance means are preferably associated with the access opening, the entrance means being adapted to permit substantially unimpaired placement of the marine animal through the access opening, and to retard the egress of the marine animal through the access opening. Various one-way "trap door" arrangements are possible. A preferred entrance includes a tapering passage with a large opening and a small opening. The large opening is fixed adjacent to, and substantially encompasses the access opening. The small opening extends into the container. Marine animals are placed through the small opening and into the rigid container, but cannot readily escape. It is preferable that the entrance be constructed of a flexible material such as netting, which will further tend to collapse upon itself to close the small opening and further retard egress of the marine animals through the entrance. The large opening can be fixed to an elastic collar, which collar is snap-fit into a portion of the rigid container adjacent to the access opening.

It is preferable to provide legs on the rigid container to allow the container to rest squarely on a surface without rolling. The legs are positioned on the rigid container substantially opposite to the valve for releasing pressure from the container, such that air in the container will accumulate adjacent to the valve and can be released from the valve to gradually reduce the pressure in the container. It is alternatively possible to bleed water through the valve to reduce pressure within the container. It is generally more time consuming, but more controlled, to release water rather than air through the valve.

BRIEF DESCRIPTION OF THE DRAWINGS

There are shown in the drawings embodiments which are presently preferred it being understood, however, that the invention is not limited to the precise arrangements and instrumentalities shown, wherein:

FIG. 2 is a side elevation.

FIG. 3 is a longitudinal cross-section.

DETAILED DESCRIPTION OF THE PREFERRED EMBODIMENTS

Figure 1:
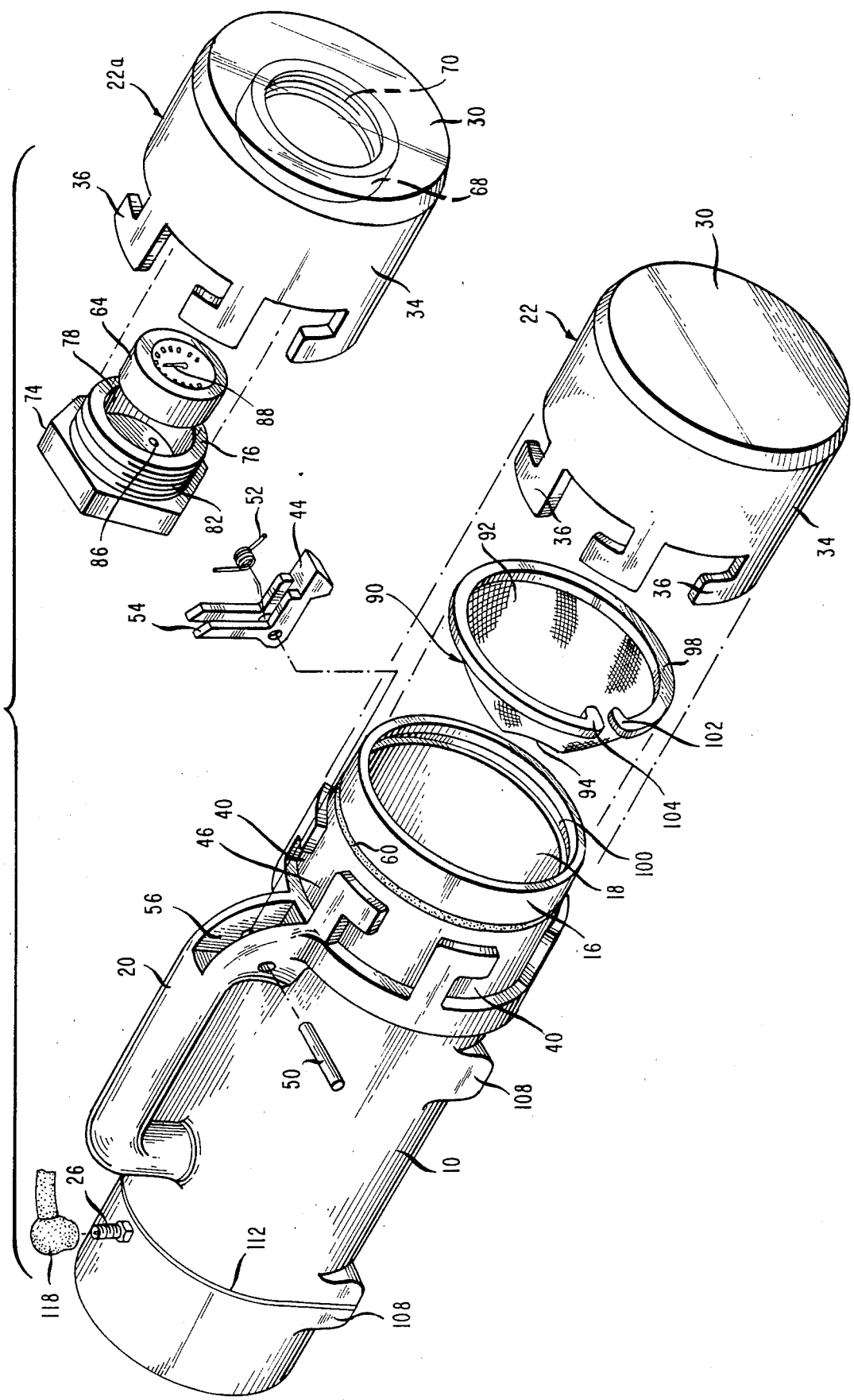
FIG. 1 is an exploded perspective of the capture apparatus according to the invention, and of alternative lid structure.

A capture apparatus according to the invention is shown in FIGS. 1-5. The capture apparatus includes a rigid container 10, having at least one access opening and defining an open interior pressure chamber 12. The rigid container 10 is preferably formed in a tubular configuration, having a closed end 14 and an open end 16 defining an access opening 18. A handle 20 can be provided for grasping the container 10. Closure structure adapted to provide a fluid-tight, pressure-tight seal for the access opening 18 is preferably provided as a lid 22.

The means for gradually releasing pressure from the rigid container 10 is preferably provided as a valve 26. The valve 26 can be positioned in several alternative locations on the rigid container 10. The valve 26 can be used to release either air or water from the pressure chamber 12 so as to gradually reduce the pressure from that of the first pressure environment, where the specimen was collected, to the second pressure environment, usually at the surface of the water. The valve 26 can be constructed from any of several suitable designs. A presently preferred construction is the familiar "bicycle" valve which includes a valve stem and a central, axially movable valve member.

The lid 22 can be joined to the rigid container 10 by any suitable means, including cooperating male and female threads, buckles, and other fastening structure. It is possible to pivotally mount the lid 22 over the access opening 18. It is presently preferred, however, to provide a lid 22 that is substantially U-shaped in cross-section with a base 30 and an annular side portion 34. The inside diameter of the annular side portion 34 is in excess of the outside diameter of the open end 16 such that the lid 22 will fit over the open end 16 to close the access opening 18. Substantially L-shaped tab projections 36 are disposed about the circumference of the annular side portion 34 so as to be substantially perpendicular to the base 30. Substantially L-shaped grooves 40 are dimensioned to permit the insertion of the L-shaped projections 36 in the manner indicated in FIG. 1. The lid 22 can then be rotated in a clockwise direction to interlock the L-shaped projections 36 with the L-shaped grooves 40 (FIG. 2).

It is preferable to provide additional safety lock structure to prevent accidental disengagement of the lid 22 from the rigid container 10. This can be accomplished by a locking tab 44. The locking tab 44 is adapted to fit into an open area 46 in the L-shaped groove 40 behind the L-shaped projection 36 when the projection 36 is interlocked with the groove 40. This will prevent the projection 36 from moving within the L-shaped groove 40 and, thereby, will prevent rotation and disengagement of the lid 22 with respect to the rigid container 10. The locking tab 44 can be pivotally mounted to the rigid container 10 about a pivot pin 50. A biasing spring 52 is provided to bias the locking tab 44 into the open area 46. A lift arm 54 is provided on the locking tab 44, which lift arm can be manipulated to pivot the locking tab 44 about the pivot pin 50 and against the bias of the spring 52 to permit disengagement of the L-shaped projection 36 from the L-shaped groove 40. The locking tab 44 can be pivotally mounted within a suitable recess 56 fashioned in the handle 20.

It is preferable to provide seal structure to insure a fluid-tight seal over the access opening 18. Preferred seal structure is an "o-ring" 60 disposed about an exterior surface of the open end 16. The "o-ring" can be seated in a circumferential groove formed within the open end 16.

The structure for indicating pressure within the rigid container 10 can be selected from several devices suitable for this purpose. The pressure indicating structure will usually be a pressure gauge in fluid communication with the pressure chamber 12 of the rigid container 10. The pressure gauge can be fixed directly to the rigid container 10. It is presently preferred, however, to provide a detachable mounting for the pressure gauge such that a pressure gauge can be temporarily attached to the invention for monitoring pressure within the pressure chamber 12. The expense of a permanent pressure gauge can thereby be avoided.

A preferred mounting for a detachable pressure gauge 64 is shown in FIG. 1, wherein alternate lid 22a is provided with structure for temporarily mounting the pressure gauge. The mounting structure is preferably a tubular casing 68 having female threads 70. A cap 74 has a tubular extension 76 defining an open interior 78. The pressure gauge 64 is dimensioned to fit into the open interior space 78. Male threads 82 are provided on the tubular extension 76 so as to engage the female threads 70 on the tubular flange 68 to secure the pressure gauge 64 within the open interior space 78. Apertures 86 are provided in the cap 74 to place the pressure gauge 64 in fluid communication with the pressure chamber 12 when the lid 22a is secured to the container 10. The dial 88 of the pressure gauge 64 can be read directly through the base 30 when the base 30 is constructed of a transparent material. Alternatively, a window can be provided in the base 30 of an alternate lid 22a to permit the diver to view the dial 88. Several alternative pressure gauges are suitable, including the model 04-1611 pressure gauge, manufactured by the Oceanic Co. of San Leandro, Calif.

It is preferable to provide entrance structure at the access opening 18 which does not substantially interfere with passage of the marine animal into the container 10, but which substantially impedes egress of the collected animals through the access opening 18 when the lid 22 is removed. Preferable entrance structure is substantially funnel shaped, with the large diameter opening attached at an inside surface of the open end 16 and substantially encompassing the access opening 18, and with the small diameter end extending into the pressure chamber 12. The funnel-shaped entrance readily permits passage of the marine animal into the container 10, but the small diameter opening of the funnel substantially impedes egress of the animal through the access opening 18.

A preferred entrance is shown in the figures and comprises a substantially funnel shaped, tapering net 90 having a large opening 92 and a small opening 94. An elastic collar 98 is fixed about the large portion of the funnel net 90 and is adapted to snap-fit into a groove 100 formed on an interior surface of the open end 16. The collar 98 has a diameter slightly in excess of the inside diameter of the open end 16, such that opposed ends 102, 104 of the collar 98 must be pressed together to install or remove the flexible collar 98 from its seat in the groove 100. The net 90 is pliable, and therefore tends to collapse on itself to close the small opening 94, which can be elongated as shown, and to thereby retard egress through the access opening 18.

It is preferable to provide legs 108 on the rigid container 10. The legs 108 provide a secure support for the rigid container, which is preferably tubular and would otherwise tend to roll. Four of the legs 108 are preferably provided and are on a side of the container 10 substantially opposite to the valve 26. In this manner, gas within the container 10 will tend to accumulate adjacent the valve 26 when the container is resting on the legs 108. The gas can then be released from within the container 10 by operation of the valve 26.

The invention can be manufactured from any of several materials suitable for this purpose. It is preferable that the container 10 and lid 22 be manufactured from rigid, water- and pressure-tight, durable, and corrosive-resistant materials. It is also preferable that at least a portion of the rigid container be substantially transparent, so that marine animals can be viewed when within the container 10. A presently preferred material is a clear polyvinyl chloride, or alternatively, a clear acrylic compound.

Figure 4:
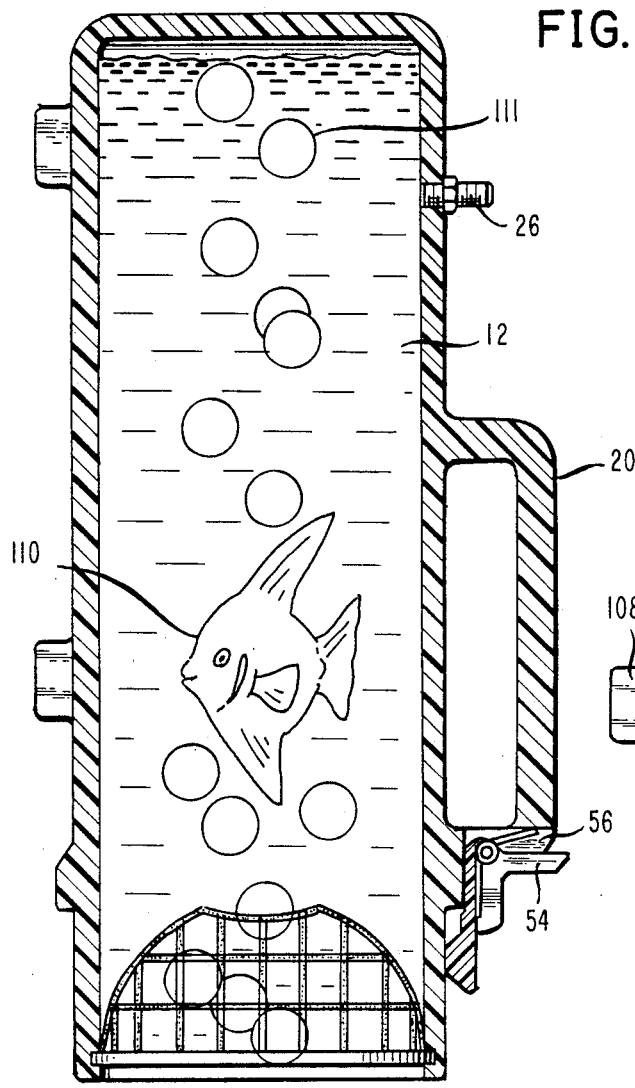
FIG. 4 is a cross-section similar to FIG. 3, and depicting a first mode of operation.
Figure 5:
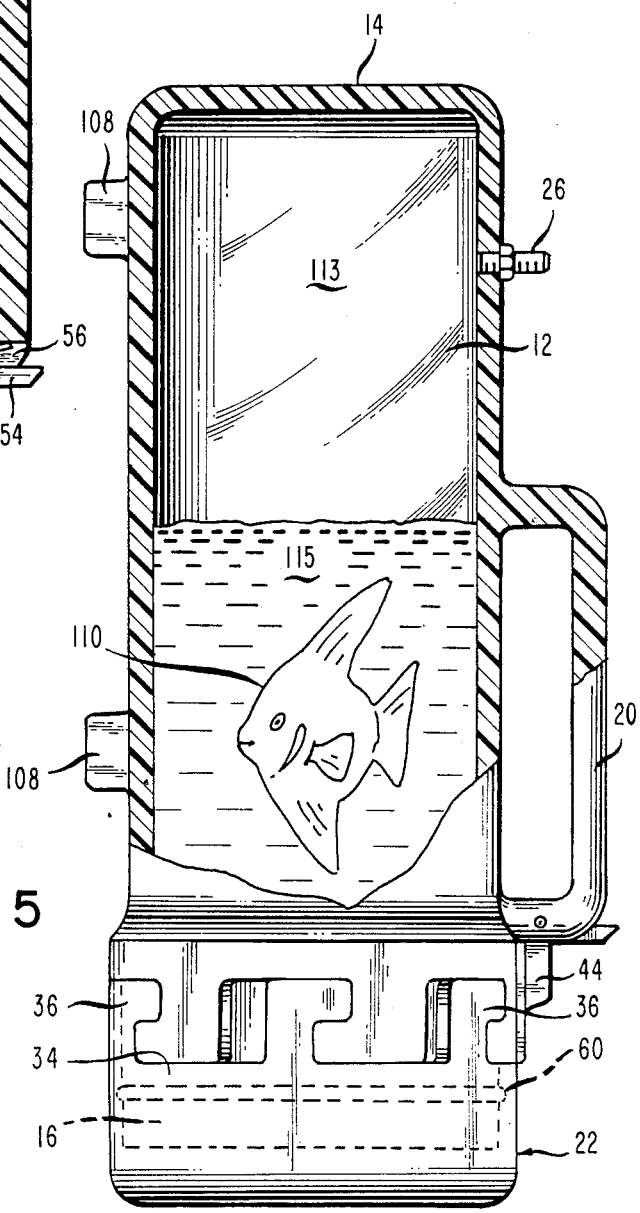
FIG. 5 is a side elevation, partially broken away, and depicting a second mode of operation.

In operation, the diver carries the capture apparatus on dives where specimens are to be collected. A marine animal 110 is captured by known techniques, and can then be placed into porous capture bags which permit oxygenated water to continuously move past the captured marine animal. It is alternatively possible to use the capture apparatus of the invention as a holding container for the marine animals during the collection process. The access opening 18 would remain uncovered to permit water to circulate through the container 10, while the entrance net 90 would prevent escape of the marine animal 110. Should the diver wish to return to the surface or to a pressure environment markedly different from that at which the specimens were collected, the diver places an amount of air into the rigid container 10 (FIG. 4). This can be accomplished using the diver's own breathing apparatus, or "regulator", to release air bubbles 111 into the pressure chamber 12. The air volume 113 that should be placed into the pressure chamber 12 will normally be less than the water volume 115, and can be visually indicated by an air volume line 112 on the container 10, or by other suitable markings. The lid 22 is then secured over the access opening 18 in a fluid-tight manner. The locking tab 44 can be positioned in the area 46 to prevent accidental disengagement (FIG. 5).

The diver then ascends to the surface or to the new pressure environment. At the surface, in the boat or on shore, the diver can then slowly release pressurized air or water through the valve 26 to lower the pressure in the rigid container 10. Remaining air in the pressure chamber 12 will expand to permit a gradual reduction in pressure within the pressure chamber 12. The pressure gauge 64 can be monitored to control the rate at which the pressure changes, particularly with regard to the specific marine animals within the container. These animals can be viewed within the container for signs of abnormal behavior, discomfort or injury caused by a reduction in pressure that is too rapid. An air pump 118 can be applied to the valve 26 to repressurize the container 10, if necessary. The marine animals can be removed from the container 10 when the pressure within the container 10 is substantially that of the surrounding pressure environment. The lid 22 and entrance net 90 can be removed to retrieve the animals from the pressure chamber 12.

This invention can be embodied in other forms without departing from the spirit or essential attributes thereof, and accordingly, reference should be had to the following claims, rather than to the foregoing specification, as indicating the scope of the invention.

I claim:

1. A capture apparatus for taking fish and other marine animals from a depth in a body of water, comprising:
    a rigid container having an open interior pressure chamber and at least one access opening;
    closure means for closing said access opening; and,
    means for gradually releasing fluid from said pressure chamber, whereby said marine animals can be secured within said rigid container by said closure means, and transported to the surface of the water or to a different pressure environment, at substantially constant fluid pressure within said capture apparatus, and whereby said fluid pressure within said container can be gradually released to permit said marine animal to become adjusted to the pressure differential.

2. The capture apparatus of claim 1, further comprising means for indicating fluid pressure within said pressure chamber.

3. The capture apparatus of claim 2, wherein said means for indicating pressure comprise a detachable pressure gauge, and means for holding said detachable pressure gauge in fluid communication with fluid sealed within said pressure chamber.

4. The capture apparatus of claim 1, wherein said closure means for said access opening comprises lid means, and means for sealably securing said lid means to said rigid container over said access opening.

5. The capture apparatus of claim 4, wherein said rigid container is substantially tubular, said tubular container having a closed end and an open end, said open end defining said access opening and having first engagement means, said lid having second engagement means, said first engagement means being engagable to said second engagement means to sealably engage said lid over said access opening.

6. The capture apparatus of claim 5, wherein said first engagement means comprises substantially L-shaped grooves disposed about the circumference of said open end, said second engagement means comprising substantially L-shaped tab protrusions disposed about the circumference of said lid, and being oriented substantially perpendicularly to said lid, said L-shaped protrusions on said lid being adapted to fit into and interlock with said L-shaped grooves at said open end to engage said lid to said open end of said tubular container.

7. The capture apparatus of claim 6, further comprising a locking tab adapted for placement into at least one of said L-shaped grooves to prevent movement of a respective L-shaped projection within said groove, and thereby to prevent disengagement of said lid from said open end.

8. The capture apparatus of claim 4, further comprising seal means, said seal means being positioned between said lid means and portions of said container surrounding said access opening, whereby a fluid-tight seal will be formed between said lid and said container when said lid is engaged to said container.

9. The capture apparatus of claim 8, wherein said seal means comprises an o-ring.

10. The capture apparatus of claim 1, further comprising viewing means for viewing said marine animals within said pressure chamber.

11. The capture apparatus of claim 1, wherein said container is substantially transparent, whereby said marine animals can be viewed when within said pressure chamber.

12. The capture apparatus of claim 1, further comprising means for indicating an amount of air introduced into said pressure chamber, whereby an indication will be provided when a sufficient amount of air has been introduced into said container to permit the gradual release of fluid pressure within said pressure chamber.

13. The capture apparatus of claim 1, further comprising entrance means at said access opening, said entrance means being adapted to permit substantially unimpaired passage of said marine animals through said access opening, and to retard the egress of said marine animals through said access opening.

14. The capture apparatus of claim 13, wherein said entrance means comprises a tapering passage with a large opening and a small opening, the large opening being positioned substantially at said access opening, and the small opening being nearest to the pressure chamber.

15. The capture apparatus of claim 14, wherein said entrance means comprises a tapering net, the large opening of said net being fixed to an elastic collar, said collar being adapted to snap-fit into a portion of said rigid container adjacent said access opening to secure said net adjacent to said access opening, whereby said collar can be flexed and removed from engagement with said container to remove said net from said access opening to permit removal of said marine animals from said pressure chamber.

16. The capture apparatus of claim 1, wherein said rigid container further comprises leg means, said leg means being positioned on said container substantially opposite to said means for releasing fluid pressure, whereby gas placed within said pressure chamber at depth will accumulate adjacent to said means for releasing pressure when said rigid container is resting on said legs, and whereby said gas can be gradually released through said means for releasing fluid, to allow marine animals in said pressure chamber to gradually become accustomed to said pressure differential.

17. An apparatus for transporting marine animals from a first pressure environment to a second pressure environment, said apparatus comprising:
    a rigid, fluid-tight container having at least one access opening;
    a fluid- and pressure-tight closure for said access opening;
    entrance means over said access opening, said entrance means being adapted to permit the passage of said animals through said entrance means and said access opening, and to retard egress of said animals through said entrance means and said access opening;
    valve means for the gradual release of fluid from within said container, and thereby the gradual release of pressure within the container; and,
    gauge means for indicating the pressure within said container, whereby said valve means can be manipulated to release fluid pressure from said container and said gauge means can be used to monitor the pressure within said container.

18. The apparatus of claim 17, wherein said container is substantially transparent, wherein said marine animals can be viewed within said container.

19. The apparatus of claim 18, wherein said container comprises means for indicating the liquid level within said container, whereby an appropriate amount of gas can be placed into said container to allow the gradual release of pressure within said container by the release of fluid through said valve means.

20. The apparatus of claim 19, wherein said container further comprises leg means, said leg means being positioned on said container substantially opposite to said valve means, whereby gas introduced into said container will accumulate adjacent to said valve means when said container is resting on said legs.

21. A method for transporting marine animals from a first pressure environment to a second pressure environment, comprising the steps of:
   placing said marine animals in a rigid container;
   closing said container so as to render said container fluid- and pressure-tight;
   transferring said container and said marine animals within said container from said first pressure environment to said second pressure environment; and,
   gradually releasing the pressure within said container to allow said underwater animals to slowly adjust to said second pressure environment by a gradual change in pressure.

22. The method of claim 21, wherein, prior to said transferring step, gas and water are introduced into said rigid container, the volume of said gas introduced into said container being less than the volume of water within said container.

23. The method of claim 22, wherein said gradual release of pressure is accomplished by the manipulation of valve means provided in said container.

24. The method of claim 23, wherein said gas is air supplied from a diver's tank.

25. The method of claim 23, wherein said pressure within said container is measured with pressure-sensing means.

26. The method of claim 23, wherein said container is repressurized through said valve after the beginning of said pressure-releasing step.

* * * * *